(12) United States Patent
Shi et al.

(10) Patent No.: US 12,342,802 B2
(45) Date of Patent: Jul. 1, 2025

(54) INTERCEPTING NET BASED ON REVERSING CURRENT MOTION AT RIVER BOTTOM

(71) Applicants: EAST CHINA SEA FISHERIES RESEARCH INSTITUTE, Shanghai (CN); HUIZHOU YICHEN NETWORK TECHNOLOGY CO., LTD, Huizhou (CN)

(72) Inventors: Jiangao Shi, Shanghai (CN); Shiqi Cheng, Shanghai (CN); Wenyang Zhang, Shanghai (CN)

(73) Assignees: EAST CHINA SEA FISHERIES RESEARCH INSTITUTE, Shanghai (CN); HUIZHOU YICHEN NETWORK TECHNOLOGY CO., LTD, Huizhou (CN)

( * ) Notice: Subject to any disclaimer, the term of this patent is extended or adjusted under 35 U.S.C. 154(b) by 0 days.

(21) Appl. No.: 18/829,270

(22) Filed: Sep. 9, 2024

(65) Prior Publication Data

US 2024/0423178 A1 Dec. 26, 2024

(30) Foreign Application Priority Data

Feb. 5, 2024 (CN) .......................... 202410162724.X

(51) Int. Cl.
*A01K 69/02* (2006.01)
(52) U.S. Cl.
CPC .................................. *A01K 69/02* (2013.01)

(58) Field of Classification Search
CPC ................................ A01K 69/02; A01K 74/00
See application file for complete search history.

(56) References Cited

U.S. PATENT DOCUMENTS

| 10,959,416 | B2 * | 3/2021 | Bajer ...................... A01K 74/00 |
| 2010/0293820 | A1 * | 11/2010 | Quintin .................. A01K 80/00 |
| | | | 493/210 |
| 2014/0259861 | A1 * | 9/2014 | Jerrett .................... A01K 73/00 |
| | | | 43/4.5 |

(Continued)

FOREIGN PATENT DOCUMENTS

| CN | 203279654 U | * 11/2013 | |
| CN | 108371150 A | * 8/2018 | ............. A01K 69/02 |

(Continued)

*Primary Examiner* — Christopher P Ellis

(57) ABSTRACT

An intercepting net based on reversing current motion at a river bottom, including a net body connected to ropes arranged in a crisscross manner, an anti-floating and anti-drifting rope and a mounting frame. A top of the net body is connected to a main rope and an auxiliary rope arranged side by side. The anti-floating and anti-drifting rope includes lead-core ropes arranged in a crisscross manner and connected to the ropes. The net body includes a vertical interception portion, whose bottom is connected to a first anti-escape net portion extending in a first direction and a second anti-escape net portion extending in a second direction opposite to the first direction. First anti-floating and anti-drifting chains are sequentially fixed on the first anti-escape net portion along the first direction. Second anti-floating and anti-drifting chains are sequentially fixed on the second anti-escape net portion along the second direction.

10 Claims, 4 Drawing Sheets

(56) References Cited

U.S. PATENT DOCUMENTS

2024/0057575 A1\* 2/2024 Hong ................... A01K 69/02

FOREIGN PATENT DOCUMENTS

| | | | | | |
|---|---|---|---|---|---|
| CN | 109221034 | A | \* | 1/2019 | |
| CN | 110692604 | A | \* | 1/2020 | |
| CN | 108077142 | B | | 10/2020 | |
| CN | 112136772 | A | \* | 12/2020 | ............ A01K 69/02 |
| CN | 113057128 | A | \* | 7/2021 | |
| CN | 218831630 | U | | 4/2023 | |
| CN | 118975533 | A | \* | 11/2024 | |
| FR | 2935998 | A1 | \* | 3/2010 | ............ A01K 79/02 |
| JP | 2008022786 | A | \* | 2/2008 | |
| JP | 2019157384 | A | \* | 9/2019 | |
| JP | 7377582 | B1 | \* | 11/2023 | |
| KR | 101374175 | B1 | \* | 3/2014 | |
| KR | 20140131242 | A | \* | 11/2014 | |
| KR | 20150028527 | A | \* | 3/2015 | |
| KR | 102152316 | B1 | \* | 9/2020 | |
| WO | WO-2009098736 | A1 | \* | 8/2009 | ............. E01F 7/045 |
| WO | WO-2018042470 | A1 | \* | 3/2018 | ................ E01F 7/04 |

\* cited by examiner

INTERCEPTING NET BASED ON REVERSING CURRENT MOTION AT RIVER BOTTOM

CROSS-REFERENCE TO RELATED APPLICATIONS

This application claims the benefit of priority from Chinese Patent Application No. 202410162724.X, filed on Feb. 5, 2024. The content of the aforementioned application, including any intervening amendments made thereto, is incorporated herein by reference in its entirety.

TECHNICAL FIELD

This application relates to research and culture of aquatic organisms, and more particularly to an intercepting net based on reversing current motion at a river bottom.

BACKGROUND

In the field of aquatic biotechnology, a closed scientific research test site or breeding area is often established with intercepting nets in a natural water environment such as shore foundations, bank slopes, and bays. For those large aquatic organisms with a chest circumference of 78-115 cm, they are easy to escape from the scientific research test field or breeding area, which increases the interception difficulty. The test field or experimental breeding area is located in a non-navigation area, and is established by intercepting nets and other embankments or slopes (such as a flow-isolating dike, a dam or a bank (embankment) of an access road), which is suitable for natural spawning and breeding or breeding experiments of scientific research aquatic organisms (such as test fish). The intercepting net plays an important role in the entire natural spawning and breeding project of aquatic organisms, and is of great significance. The previous research results reveal that there are some serious defects in the existing interception methods for aquatic organisms (such as test fish), for example, the net bottom is detached from the river bottom to allow the escape of fish; and the net bottom is floated to drift. The effective connection between the bottom of the intercepting net and the river bottom is necessary for the normal operation of the intercepting net, which directly determines whether the aquatic organisms (such as test fish) can be effectively intercepted by the intercepting net within the test field. Reversing current is a tidal current that reverses every time a slack tide occurs. Due to the limitations of terrain conditions, the maximum current velocity is mainly observed in two opposite directions. In the prior art, the intercepting net is deployed simply by fixing its two sides to the bank bases, and there is no connection structure between the net bottom and the river bottom, such that under the action of revering current at the river bottom, the intercepting net is more prone to floating and drifting, resulting the escape of aquatic organisms such as test fish. The floating and drifting of the intercepting net under the action of revering current have not been overcome yet. There is an urgent need to develop an improved intercepting net to solve the above problems in the prior art.

SUMMARY

An object of the disclosure is to provide an intercepting net based on reversing current motion at a river bottom, so as to overcome at least one of the technical problems in the prior art.

In order to achieve the above object, the following technical solutions are adopted.

This application provides an intercepting net based on reversing current motion at a river bottom, comprising:
  a net body;
  an anti-floating and anti-drifting rope assembly; and
  a mounting frame;
  wherein a plurality of ropes arranged in a crisscross manner are connected to the net body; and a top of the net body is connected to a main rope and an auxiliary rope, and the main rope and the auxiliary rope are arranged side by side;
  the anti-floating and anti-drifting rope assembly comprises a plurality of lead-core ropes arranged in a crisscross manner; the plurality of lead-core ropes are connected to the plurality of ropes; and a weight of each of the plurality of lead-core ropes is 1.3-4.7 kg/m; a lead-core wire used for the lead core connection in the lead-core ropes can be a basalt wire with a diameter of 0.8-1.7 mm, so as to effectively improve comprehensive performance such as creep resistance of the lead-core ropes through the basalt lead-core wire material;
  the net body comprises an interception portion arranged vertically, and a bottom of the interception portion is connected to a first anti-escape net portion extending in a first direction and a second anti-escape net portion extending in a second direction opposite to the first direction; a plurality of first anti-floating and anti-drifting chains are fixed on the first anti-escape net portion in sequence along the first direction, and a length direction of each of the plurality of first anti-floating and anti-drifting chains is perpendicular to the first direction; and a plurality of second anti-floating and anti-drifting chains are fixed on the second anti-escape net portion in sequence along the second direction, and a length direction of each of the plurality of second anti-floating and anti-drifting chains is perpendicular to the second direction;
  at least one of the first anti-escape net portion and the second anti-escape net portion is connected to the mounting frame; the mounting frame comprises a plurality of support beams arranged side by side along the first direction; a bottom of each of the plurality of support beams is connected to a mounting piece, and the mounting piece is provided with a mounting hole configured to allow a peg to pass through; and
  the plurality of support beams are connected through a reinforcing rod.

The interception net provided herein can effectively prevent aquatic organisms (such as test fish) from escaping at the net bottom, and simultaneously avoid the floating of the net bottom. In addition, the arrangement of the first anti-escape net portion and the second anti-escape net portion not only prevents the escape of cultured and tested aquatic organisms (such as test fish) and the invasion of foreign aquatic organisms (such as foreign hostile fish) under the reversing current motion along the first and second directions, but also greatly reduces the force of the intercepting net on the mounting frame, resulting in a buffer between the intercepting net and the mounting frame.

In some embodiments, each of the plurality of support beams comprises a plurality of I-shaped steels arranged along a length direction of each of the plurality of support beams, and two adjacent I-shaped steels among the plurality of I-shaped steels are detachably connected by a connecting piece; and the plurality of I-shaped steels are each provided with a waist-shaped hole, and the connecting piece is provided with a circular hole; and the connecting piece is connected to a corresponding one of the plurality of I-shaped steels via a bolt passing through the circular hole and the waist-shaped hole.

In some embodiments, the plurality of first anti-floating and anti-drifting chains and the plurality of second anti-floating and anti-drifting chains each have a diameter of 70 mm and a weight of 200 kg/m.

In a case where a reversing current velocity at the river bottom is lower than 3.45 m/s, the bottom of the intercepting net can be prevented from detaching and floating.

In some embodiments, the peg has a length of not less than 1 m and a diameter of not less than 30 mm.

In some embodiments, tops of the plurality of support beams are connected to an upper crossbeam through support members arranged along a length direction of the plurality of support beams, and a gap between the upper crossbeam and the plurality of support beams is less than 2.6 cm; and a gap between two adjacent support beams among the plurality of support beams is 1 m, and a diameter of the reinforcing rod is 30 mm.

In some embodiments, the net body has a mesh size of 20 cm, a net wire diameter of 3.5 mm, a fictitious area coefficient of 0.035 and a hanging ratio $E_t$ of 0.7; a wire area of the net body is 333.63 m²; a chest circumference range of an interception object of the intercepting net is 78-115 cm; and the net body can be made of ultra-high-molecular-weight polyethylene (UHMWPE) knotless warp knitted net, so as to effectively improve the comprehensive performance such as abrasion resistance of the net body.

In some embodiments, the plurality of ropes have a vertical and horizontal spacing of 2.5 m, a diameter of 18 mm, a fictitious area coefficient of 0.0072 and a hanging ratio $E_t$ of 0.707; and the plurality of ropes can be UHMWPE round strand woven ropes to effectively improve the appearance and abrasion resistance.

In some embodiments, a gap between two adjacent lead-core ropes among the plurality of lead-core ropes is 5 m.

In some embodiments, a diameter of the main rope is 58 mm, and a diameter of the auxiliary rope is 40 mm.

When a cross-section current velocity at a test site where the intercepting net is located is 3.45 m/s, a total resistance of the intercepting net is 241 t. If an average current velocity of a cross-section where the intercepting net is located is less than 3.45 m/s, a corresponding total resistance of the intercepting net should be less than 241 t. Considering safety, a safety factor is set to 1.5, a load of the main rope needs to reach 361.5 t, and ultra-high strength ropes with specifications of 74 mm or more (a breaking strength index of ultra-high strength ropes with a nominal diameter of 74 mm is 361.5 t) can be selected, which can ensure the safety of the main rope of the intercepting net at the reversing current velocity of 3.45 m/s. Based on the fact that there are few companies in the field that produce ultra-high strength ropes with a nominal diameter of 74 mm or more, a special double main rope structure of "main rope+auxiliary rope" (the diameter of the main rope is 58 mm, and the diameter of the auxiliary rope is 40 mm) is adopted, which not only facilitates the implementation of the present disclosure and the convenience of purchasing ultra-high-strength ropes, but also improves the safety and appearance quality of the intercepting net under the same conditions. A breaking strength index of the ultra-high-strength rope main rope with a specification of 58 mm made of a UHMWPE fiber material is about 240 t, a breaking strength of the auxiliary rope should be 121.5 t, and a corresponding ultra-high-strength rope made of the UHMWPE fiber material has a diameter of 40 mm. This can ensure the safety of the main rope at the reversing current velocity of 3.45 m/s.

In some embodiments, the intercepting net further comprises a pulling mechanism for retarding water flow, wherein the pulling mechanism comprises at least three sinking chains distributed along a length direction of the plurality of support beams, and each of the at least three sinking chains is arranged vertically; two adjacent sinking chains among the at least three sinking chains are connected via a third anti-floating and anti-drifting chain; and a bottom of each of the at least three sinking chains is connected to at least one of the plurality of support beams.

In a case of high impact force of a water flow, the sinking chains are driven by the impact force of the water flow to move. The arrangement of the sinking chains avoids the retarding water flow between the impact force of the water flow and the force of the mounting frame, which greatly guarantees a service life of the mounting frame and avoids the mounting frame from loosening and detaching under high current velocity.

In some embodiments, the third anti-floating and anti-drifting chain is located in an area where the interception portion is adjacent to the mounting frame.

In some embodiments, the number of the plurality of first anti-floating and anti-drifting chains is two, and a gap between two first anti-floating and anti-drifting chains is 1-2 m, thereby realizing step-by-step protection.

In some embodiments, the number of the plurality of second anti-floating and anti-drifting chains is two, and a gap between two second anti-floating and anti-drifting chains is 1-2 m, thereby realizing step-by-step protection.

Compared to the prior art, the present disclosure has the following beneficial effects.

The present disclosure adopts new materials, processes or structures such as the anti-floating and anti-drifting rope assembly, the specific first and second anti-escape net portions connected to the bottom of the interception portion, the pulling mechanism, the first and second anti-floating and anti-drifting chains, the specific double main rope structure of "main rope+auxiliary rope", the UHMWPE round strand woven ropes, the UHMWPE knotless warp knitted net and basalt lead core lines. This not only provides excellent comprehensive performance of the intercepting net, and effectively solves the problem of fish escaping due to the detachment of the net bottom under the action of reversing current, but also solves the problem of floating and drifting of the net bottom. The intercepting net is different from the intercepting nets in other fields. The present disclosure has remarkable technical effects and obvious comprehensive benefits.

Figure 1:
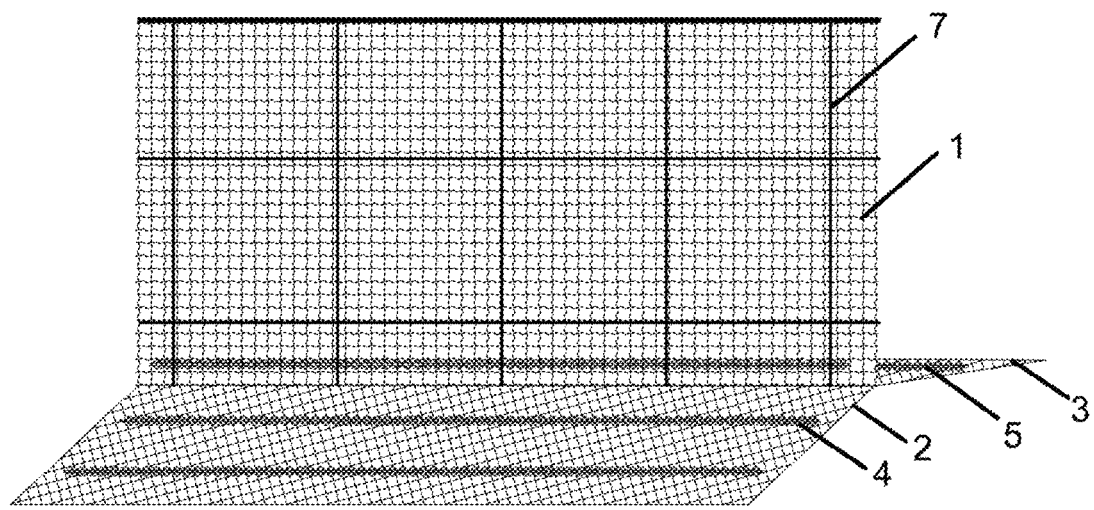
FIG. 1 is a structural schematic diagram of an intercepting net based on reversing current motion at a river bottom in Embodiment 1 of the present disclosure.

In the drawings: 1. interception portion; 2. first anti-escape net portion; 3. second anti-escape net portion; 4. first anti-floating and anti-drifting chain; 5. second anti-floating and anti-drifting chain; 6. mounting frame; 7. lead-core rope; 61. support beam; 62. connecting piece; 63. upper crossbeam; 64. reinforcing rod; 8. sinking chain; and 9. third anti-floating and anti-drifting chain.

DETAILED DESCRIPTION OF EMBODIMENTS

Embodiment 1

Figure 2:
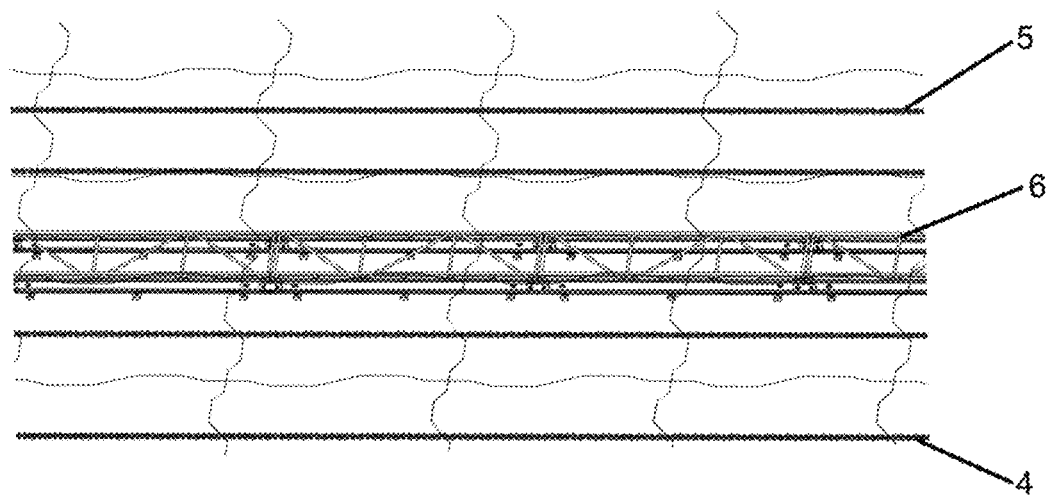
FIG. 2 is a partial view of the intercepting net in Embodiment 1 of the present disclosure.
Figure 3:
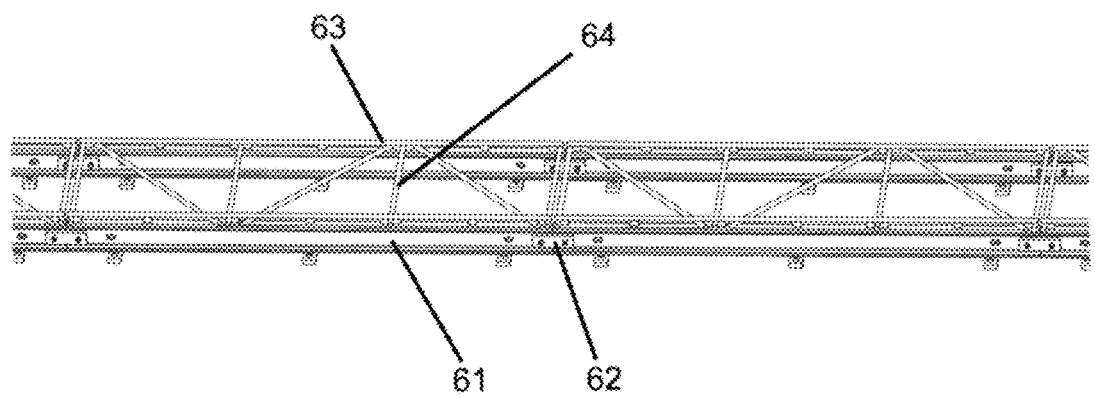
FIG. 3 is another partial view of the intercepting net in Embodiment 1 of the present disclosure.

Referring to FIGS. 1-3, an intercepting net based on reversing current motion at a river bottom is provided. The intercepting net includes a net body. A plurality of ropes arranged in a crisscross manner are connected to the net body. A top of the net body is connected to a main rope and an auxiliary rope. The main rope and the auxiliary rope are arranged side by side. The intercepting net further includes an anti-floating and anti-drifting rope assembly. The anti-floating and anti-drifting rope assembly includes a plurality of lead-core ropes 7 arranged in a crisscross manner. The plurality of lead-core ropes 7 are connected to the plurality of ropes (which can be fixed with a net line material such as a basalt fiber line material). A weight of each of the plurality of lead-core ropes 7 is 1.3-4.7 kg/m (a lead-core wire used for the lead core connection in the plurality of lead-core ropes can be a basalt wire with a diameter of 0.8-1.7 mm, so as to effectively improve the comprehensive performance such as creep resistance of the plurality of lead-core ropes through the basalt fiber line material). The net body includes an interception portion 1 arranged vertically. A bottom of the interception portion 1 is connected to a first anti-escape net portion 2 extending in a first direction and a second anti-escape net portion 3 extending in a second direction opposite to the first direction. A plurality of first anti-floating and anti-drifting chains 4 are fixed on the first anti-escape net portion 2 in sequence along the first direction. A length direction of each of the plurality of first anti-floating and anti-drifting chains 4 is perpendicular to the first direction. A plurality of second anti-floating and anti-drifting chains 5 are fixed on the second anti-escape net portion 3 in sequence along the second direction. A length direction of each of the plurality of second anti-floating and anti-drifting chains 5 is perpendicular to the second direction. The intercepting net further includes a mounting frame. At least one of the first anti-escape net portion 2 and the second anti-escape net portion 3 is connected to the mounting frame. The mounting frame includes a plurality of support beams 61 arranged side by side along the first direction. A bottom of each of the plurality of support beams 61 is connected to a mounting piece. The mounting piece is provided with a mounting hole configured to allow a peg to pass through. The plurality of support beams 61 are connected through a reinforcing rod 64. The intercepting net provided herein can prevent aquatic organisms at a bottom of the intercepting net from escaping, and simultaneously avoid the bottom of the intercepting net from floating. The mounting piece is fixed by the peg.

A longitudinal length of the interception portion is greater than a distance from a connection between a top of the interception portion and a river bank to the river bottom (for example, when a river depth is 22 m, the longitudinal length or a tension length of the interception portion can be 31.1 m). Left and right sides of the river bank are each mounted with a mounting frame. The left and right sides of the interception portion are connected to the corresponding mounting frame, respectively. The structure of the mounting frames is shown in FIG. 3. During actual implementation, the mounting is carried out according to terrain contours on the left and right sides of the river bank, such that the mounting frame is effectively connected to bank bases on the left and right sides.

Each of the plurality of support beams 61 includes a plurality of I-shaped steels arranged along a length direction of each of the plurality of support beams. Two adjacent I-shaped steels among the plurality of I-shaped steels are detachably connected by a connecting piece 62. The plurality of I-shaped steels are each provided with a waist-shaped hole, and the connecting piece 62 is provided with a circular hole. The connecting piece 62 is connected to a corresponding one of the plurality of I-shaped steels via a bolt passing through the circular hole and the waist-shaped hole.

The plurality of first anti-floating and anti-drifting chains 4 and the plurality of second anti-floating and anti-drifting chains 5 each have a diameter of 70 mm and a weight of 200 kg/m. In a case where a reversing current velocity at the river bottom is lower than 3.45 m/s, the bottom of the intercepting net can be prevented from detaching and floating.

The peg has a length of not less than 1 m and a diameter of not less than 30 mm. The peg is configured to fix the mounting frame to the river bottom. A length direction of the mounting piece is parallel to the second direction. Two ends of the mounting piece extend along the length direction respectively to serve as a support frame.

Tops of the plurality of support beams 61 are connected to an upper crossbeam 63 through support members arranged along a length direction of the plurality of support beams. A gap between the upper crossbeam 63 and the plurality of support beams 61 is less than 2.6 cm, so as to ensure that the test aquatic organisms cannot escape from the gap between the upper crossbeam 63 and the plurality of support beams 61 (for example, during actual implementation, a test sturgeon intercepted by the intercepting net has a total length of 180 cm, a chest circumference of 86 cm and an approximate body height of 27.4 cm, whose approximate body height is much greater than the gap between the upper crossbeam 63 and the plurality of support beams 61). A gap between two adjacent support beams among the plurality of support beams 61 is 1 m, and a diameter of the reinforcing rod 64 is 30 mm. In the production of the interception net, the gap between two adjacent support beams 61 can be adjusted within a range of 0.4-1.6 m as required.

The net body has a mesh size of 20 cm, a net wire diameter of 3.5 mm, a fictitious area coefficient of 0.035 and a hanging ratio $E_t$ of 0.7. A wire area of the net body is 333.63 m². A chest circumference range of an interception object of the intercepting net is 78-115 cm. The net body can be made of ultra-high-molecular-weight polyethylene (UHMWPE) knotless warp knitted net with a diamond mesh shape, so as to effectively improve the comprehensive performance such as abrasion resistance of the net body.

The plurality of ropes have a vertical and horizontal spacing of 2.5 m, a diameter of 18 mm, a fictitious area coefficient of 0.0072 and a hanging ratio $E_t$ of 0.707. The plurality of ropes can be UHMWPE round strand woven ropes to effectively improve the comprehensive performance such as appearance, abrasion resistance and impact resistance of the plurality of ropes. A gap between two adjacent lead-core ropes among the plurality of lead-core ropes 7 is 5 m. A diameter of the main rope is 58 mm, and a diameter of the auxiliary rope is 40 mm. In this embodiment, the interception object of the intercepting net (such as sturgeon for scientific research experiments) has a total length of 180 cm, a chest circumference of 86 cm and an approximate body height of 27.4 cm, and therefore the mesh size of the net body is selected as 20 cm. In other embodiments, in the production of the intercepting net, the mesh size can be determined according to the chest circumference of the interception object (such as sturgeon and trout for scientific research experiments).

When a cross-sectional current velocity at a test site where the intercepting net is located is 3.45 m/s, a total resistance of the intercepting net is 241 t. If an average current velocity of the cross-section where the intercepting net is located is less than 3.45 m/s, a corresponding total resistance of the intercepting net should be less than 241 t. Considering safety, a safety factor is set to 1.5, a load of the main rope needs to reach 361.5 t. In this case, ultra-high strength ropes with specifications of 74 mm or more (for example, a breaking strength index of ultra-high strength ropes with a nominal diameter of 74 mm is 361.5 t) can be selected, which can ensure the safety of the main rope of the intercepting net at the reversing current velocity of 3.45 m/s. Based on the fact that there are few companies in the field that produce ultra-high strength ropes with a nominal diameter of 74 mm or more, a specific double main rope structure of "main rope+auxiliary rope" (the diameter of the main rope is 58 mm, and the diameter of the auxiliary rope is 40 mm) is adopted, which not only facilitates the implementation of the present disclosure and the convenience of purchasing ultra-high-strength ropes, but also improves the safety and appearance quality of the intercepting net under the same conditions. A breaking strength index of the ultra-high-strength rope main rope with a specification of 58 mm and made of a UHMWPE fiber material is about 240 t. A breaking strength of the auxiliary rope should be 121.5 t, and a corresponding ultra-high-strength rope made of the UHMWPE fiber material has a diameter of 40 mm. This can ensure the safety of the main rope at the reversing current velocity of 3.45 m/s. In the production of the intercepting net, in order to further reduce the diameter of the main rope and the auxiliary rope, improve the mounting speed of the intercepting net and reduce the sag of the main rope after mounting, a poly-p-phenylene benzobisoxazole (PBO) fiber rope material can also be adopted to make the main rope and the auxiliary rope. In this embodiment, the main rope with a nominal diameter of 53 mm and made of the PBO fiber rope material has a breaking strength of 243 t and a nominal diameter of 37 mm. The auxiliary rope made of the PBO fiber rope material has a breaking strength of 123 t. The above PBO fiber rope material can fully guarantee the safety of the main rope at the reversing current velocity of 3.45 m/s.

The number of the plurality of first anti-floating and anti-drifting chains 4 is two, and gap between two first anti-floating and anti-drifting chains 4 is 1-2 m, which facilitates step-by-step protection and effectively prevents the intercepting net from floating and drifting. The number of the plurality of second anti-floating and anti-drifting chains 5 is two, and a gap between two second anti-floating and anti-drifting chains is 1-2 m, which facilitates step-by-step protection and effectively prevents the intercepting net from floating and drifting. After long-term hard work and countless arduous tests, the above intercepting net is finally manufactured. New materials, processes or structures such as the anti-floating and anti-drifting rope assembly, the specific first and second anti-escape net portions connected to the bottom of the interception portion, the pulling mechanism, the first and second anti-floating and anti-drifting chains, the specific double main rope structure of "main rope+auxiliary rope", the UHMWPE round strand woven ropes, the UHMWPE knotless warp knitted net and basalt lead core lines are adopted. According to relevant production practices, it has been proved that this not only provides excellent comprehensive performance of the intercepting net, effectively solves the problem of fish escaping due to the detachment of the bottom of the intercepting net under the action of reversing current, but also solves the problem of floating and drifting of the net bottom. The intercepting net is different from the intercepting nets in other fields. The present disclosure has remarkable technical effects and obvious comprehensive benefits.

Embodiment 2

Figure 4:
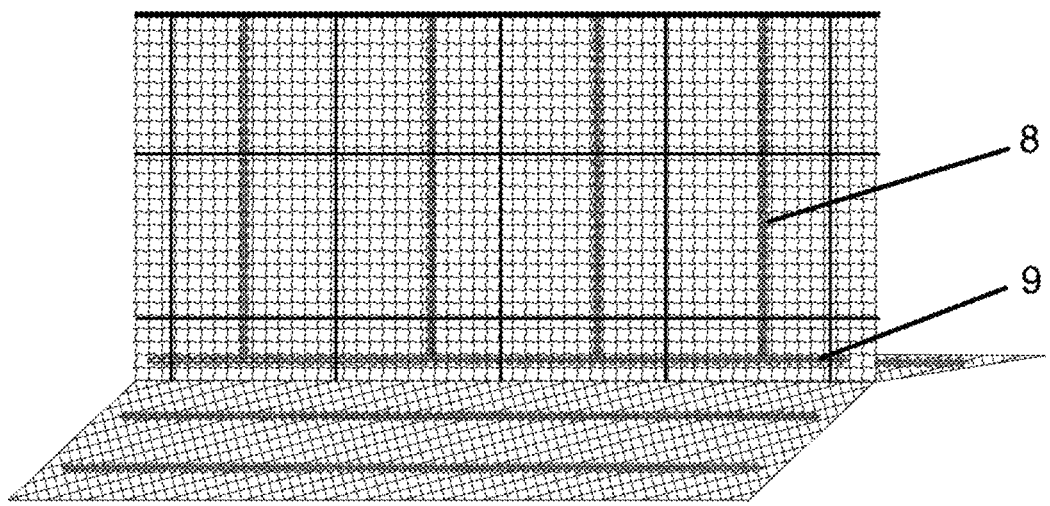
FIG. 4 is a structural schematic diagram of an intercepting net based on reversing current motion at a river bottom in Embodiment 2 of the present disclosure.

Referring to FIG. 4, an intercepting net based on reversing current motion at a river bottom is provided. On the basis of Embodiment 1, the intercepting net further includes a pulling mechanism for retarding the water flow. The pulling mechanism includes at least three sinking chains 8 arranged vertically distributed along a length direction of the plurality of support beams. Each of the at least three sinking chains 8 is arranged vertically. Two adjacent sinking chains among the at least three sinking chains 8 are connected via a third anti-floating and anti-drifting chain 9. A bottom of each of the at least three sinking chains 8 is connected to at least one of the plurality of support beams 61. In a case of high impact force of a water flow, the sinking chains 8 are driven by the impact force of the water flow to move. The arrangement of the sinking chains 8 avoids the retarding water flow between the impact force of the water flow and the force of the mounting frame, which greatly guarantees a service life of the mounting frame and avoids the loosening of the mounting frame under high current velocity. The third anti-floating and anti-drifting chain 9 is located in an area where the interception portion is adjacent to the mounting frame. According to relevant production practices, it has been proved that the intercepting net provided herein can be widely used in this field. The intercepting net can effectively solve the prominent problems of fish escaping from the net bottom and the floating and drifting of the net bottom. Therefore, the present disclosure has remarkable technical effects and obvious comprehensive benefits.

The embodiments described above are merely illustrative of the present disclosure, and are not intended to limit the patent scope of the present disclosure. It should be understood that various improvements and modifications made by those skilled in the art without departing from the spirit of the disclosure shall fall within the scope of the present disclosure defined by the appended claims.

What is claimed is:

1. An intercepting net based on reversing current motion at a river bottom, comprising:
   a net body;
   an anti-floating and anti-drifting rope assembly; and
   a mounting frame;
   wherein a plurality of ropes arranged in a crisscross manner are connected to the net body; and a top of the net body is connected to a main rope and an auxiliary rope, and the main rope and the auxiliary rope are arranged side by side;
   the anti-floating and anti-drifting rope assembly comprises a plurality of lead-core ropes arranged in a crisscross manner; the plurality of lead-core ropes are connected to the plurality of ropes; and a weight of each of the plurality of lead-core ropes is 1.3-4.7 kg/m;
   the net body comprises an interception portion arranged vertically, and a bottom of the interception portion is connected to a first anti-escape net portion extending in a first direction and a second anti-escape net portion extending in a second direction opposite to the first direction; a plurality of first anti-floating and anti-drifting chains are fixed on the first anti-escape net portion in sequence along the first direction, and a length direction of each of the plurality of first anti-floating and anti-drifting chains is perpendicular to the first direction; and a plurality of second anti-floating and anti-drifting chains are fixed on the second anti-escape net portion in sequence along the second direction, and a length direction of each of the plurality of second anti-floating and anti-drifting chains is perpendicular to the second direction;

at least one of the first anti-escape net portion and the second anti-escape net portion is connected to the mounting frame; the mounting frame comprises a plurality of support beams arranged side by side along the first direction; a bottom of each of the plurality of support beams is connected to a mounting piece, and the mounting piece is provided with a mounting hole configured to allow a peg to pass through; and the plurality of support beams are connected through a reinforcing rod.

2. The intercepting net of claim 1, wherein each of the plurality of support beams comprises a plurality of I-shaped steels arranged along a length direction of each of the plurality of support beams, and two adjacent I-shaped steels among the plurality of I-shaped steels are detachably connected by a connecting piece; and the plurality of I-shaped steels are each provided with a waist-shaped hole, and the connecting piece is provided with a circular hole; and the connecting piece is connected to a corresponding one of the plurality of I-shaped steels via a bolt passing through the circular hole and the waist-shaped hole.

3. The intercepting net of claim 1, wherein the plurality of first anti-floating and anti-drifting chains and the plurality of second anti-floating and anti-drifting chains each have a diameter of 70 mm and a weight of 200 kg/m.

4. The intercepting net of claim 1, wherein the peg has a length of not less than 1 m and a diameter of not less than 30 mm.

5. The intercepting net of claim 1, wherein tops of the plurality of support beams are connected to an upper crossbeam through support members arranged along a length direction of the plurality of support beams, and a gap between the upper crossbeam and the plurality of support beams is less than 2.6 cm; and a gap between two adjacent support beams among the plurality of support beams is 1 m, and a diameter of the reinforcing rod is 30 mm.

6. The intercepting net of claim 1, wherein the net body has a mesh size of 20 cm, a net wire diameter of 3.5 mm, a fictitious area coefficient of 0.035 and a hanging ratio $E_t$ of 0.7; a wire area of the net body is 333.63 $m^2$; and a chest circumference range of an interception object of the intercepting net is 78-115 cm.

7. The intercepting net of claim 1, wherein the plurality of ropes have a vertical and horizontal spacing of 2.5 m, a diameter of 18 mm, a fictitious area coefficient of 0.0072 and a hanging ratio $E_t$ of 0.707.

8. The intercepting net of claim 1, wherein a diameter of the main rope is 58 mm, and a diameter of the auxiliary rope is 40 mm.

9. The intercepting net of claim 1, further comprising:

a pulling mechanism for retarding water flow;

wherein the pulling mechanism comprises at least three sinking chains distributed along a length direction of the plurality of support beams, and each of the at least three sinking chains is arranged vertically; two adjacent sinking chains among the at least three sinking chains are connected via a third anti-floating and anti-drifting chain; and a bottom of each of the at least three sinking chains is connected to at least one of the plurality of support beams.

10. The intercepting net of claim 1, wherein the number of the plurality of first anti-floating and anti-drifting chains is two, and a gap between two first anti-floating and anti-drifting chains is 1-2 m; and the number of the plurality of second anti-floating and anti-drifting chains is two, and a gap between two second anti-floating and anti-drifting chains is 1-2 m.

* * * * *